United States Patent
Franzosi et al.

(10) Patent No.: US 8,999,164 B2
(45) Date of Patent: Apr. 7, 2015

(54) PROCESS FOR THE PURIFICATION OF AN AQUEOUS STREAM COMING FROM THE FISCHER-TROPSCH REACTION

(75) Inventors: Giuliana Franzosi, Novara (IT); Pietro Cesti, Trecate (IT); Roberto Paglino, Trecate (IT); Lino Carnelli, Carbonate (IT); Roberta Miglio, Oleggio (IT)

(73) Assignee: ENI S.p.A., Rome (IT)

( * ) Notice: Subject to any disclaimer, the term of this patent is extended or adjusted under 35 U.S.C. 154(b) by 760 days.

(21) Appl. No.: 13/254,621

(22) PCT Filed: Feb. 18, 2010

(86) PCT No.: PCT/EP2010/001098
§ 371 (c)(1),
(2), (4) Date: Nov. 14, 2011

(87) PCT Pub. No.: WO2010/099882
PCT Pub. Date: Sep. 10, 2010

(65) Prior Publication Data
US 2012/0055868 A1    Mar. 8, 2012

(30) Foreign Application Priority Data
Mar. 5, 2009   (IT) .............................. MI2009A0326

(51) Int. Cl.
*C02F 3/28*    (2006.01)
*C02F 1/04*    (2006.01)
(Continued)

(52) U.S. Cl.
CPC ... *C02F 1/04* (2013.01); *C02F 1/20* (2013.01); *C02F 1/441* (2013.01); *C02F 1/444* (2013.01);
(Continued)

(58) Field of Classification Search
CPC .............. C02F 1/04; C02F 1/20; C02F 1/441; C02F 1/444; C02F 1/66; C02F 3/1268; C02F 3/28; C02F 3/2846; C02F 2101/32; C02F 2101/34; C02F 2101/36; C02F 2303/10
USPC .................. 210/603, 612, 615, 616, 617, 631
See application file for complete search history.

(56) References Cited

U.S. PATENT DOCUMENTS 7,318,894 B2 * 1/2008 Juby et al. ..................... 210/603
7,410,584 B2 * 8/2008 Devine ......................... 210/605
(Continued)

FOREIGN PATENT DOCUMENTS

CN    101319230 A  * 12/2008
JP    59 046183       3/1984
(Continued)

OTHER PUBLICATIONS

U.S. Appl. No. 13/318,498, filed Nov. 2, 2011, Miglio.
(Continued)

*Primary Examiner* — Fred Prince
(74) *Attorney, Agent, or Firm* — Oblon, McClelland, Maier & Neustadt, L.L.P.

(57) ABSTRACT

Process for the purification of an aqueous stream coming from the Fischer-Tropsch reaction which comprises: —feeding said aqueous stream containing the organic by-products of the reaction to a distillation column, obtaining two output streams: —an aqueous stream (i) exiting from the column head, enriched with alcohols having from 1 to 20 carbon atoms, preferably from 1 to 9 carbon atoms, and other optional volatile compounds; an aqueous stream (ii) exiting from the column bottom, enriched with organic acids having from 1 to 10 carbon atoms, preferably from 2 to 6 carbon atoms; —subjecting said aqueous stream (ii) to an anaerobic biological treatment obtaining a purified aqueous stream (iii); wherein said anaerobic biological treatment is carried out with a hydraulic retention time lower than 15 hours, preferably ranging from 4 hours to 10 hours, more preferably ranging from 5 hours to 8 hours.

21 Claims, 1 Drawing Sheet

(51) Int. Cl.
  *C02F 1/20* (2006.01)
  *C02F 1/44* (2006.01)
  *C02F 1/66* (2006.01)
  *C02F 3/12* (2006.01)
  *C02F 101/32* (2006.01)
  *C02F 101/34* (2006.01)
  *C02F 103/36* (2006.01)

(52) U.S. Cl.
  CPC .................. *C02F 1/66* (2013.01); *C02F 3/1268* (2013.01); *C02F 3/28* (2013.01); *C02F 3/2846* (2013.01); *C02F 2101/32* (2013.01); *C02F 2101/34* (2013.01); *C02F 2103/36* (2013.01); *C02F 2303/10* (2013.01)

(56) References Cited

U.S. PATENT DOCUMENTS

2005/0131086 A1  6/2005  Dancuart et al.
2009/0078648 A1* 3/2009  Torrijos et al. ................ 210/618

FOREIGN PATENT DOCUMENTS

| WO | 03 106351 | 12/2003 |
| WO | 03 106353 | 12/2003 |
| WO | 03 106354 | 12/2003 |

OTHER PUBLICATIONS

International Search Report issued Jun. 24, 2010 in PCT/EP10/001098 filed Feb. 18, 2010.

* cited by examiner

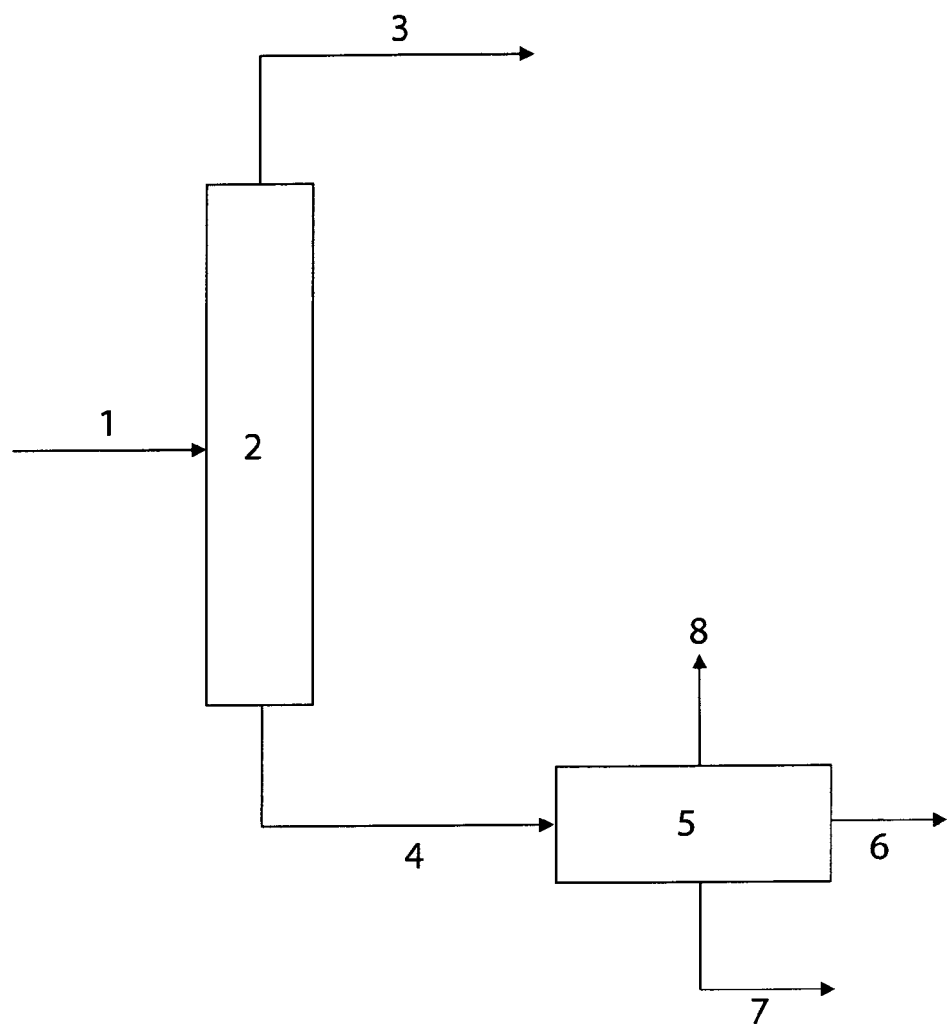

PROCESS FOR THE PURIFICATION OF AN AQUEOUS STREAM COMING FROM THE FISCHER-TROPSCH REACTION

This application is a National Stage of PCT/EP10/001,098 filed Feb. 18, 2010 and claims the benefit of Italian patent application MI2009A 000326 filed Mar. 5, 2009.

The present invention relates to a process for the purification of an aqueous stream coming from the Fischer-Tropsch reaction.

More specifically, the present invention relates to a process for the purification of an aqueous stream coming from the Fischer-Tropsch reaction which comprises subjecting said aqueous stream to a distillation and/or stripping treatment and to an anaerobic biological treatment.

The Fischer-Tropsch technology for preparing hydrocarbons from mixtures of gases based on hydrogen and carbon monoxide, conventionally known as synthesis gas ("syngas"), is known in scientific literature. A compendium which summarizes the main works on the Fischer-Tropsch reaction is contained in the Bureau of Mines Bulletin, 544 (1955) entitled "Bibliography of the Fischer-Tropsch Synthesis and Related Processes" H. C. Anderson, J. L. Wiley and A. Newell.

The Fischer-Tropsch reaction, typically, produces a mixture of gaseous hydrocarbons, liquid hydrocarbons, and waxes, having a number of carbon atoms varying from 1 to 100 or more, and having different molecular weights. Depending on the molecular weights distribution, these mixtures are suitable for different uses. Mixtures containing liquid hydrocarbons, for example, can be subjected to further treatment in order to obtain gasoline, as well as medium distillates. The waxes can be subjected to a further treatment in order to be converted to liquid and/or gaseous hydrocarbons. Consequently, in order to use the Fischer-Tropsch reaction for the subsequent production of fuel, it is desirable to increase the production of liquid hydrocarbons and/or waxes, such as hydrocarbons having at least 5 carbon atoms per molecule ($C_{5+}$ hydrocarbons).

In addition to mixtures of hydrocarbons, the Fischer-Tropsch reaction also generates water according to the following equation:

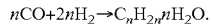

$$nCO + 2nH_2 \rightarrow C_nH_{2n}, nH_2O.$$

The production of water is quite significant as a mole of water is produced for each mole of carbon monoxide converted to hydrocarbons. Typically, when non-shifting catalysts are used, for example, cobalt and/or ruthenium, the reaction known as "water-gas-shift" is minimum so that the total production of water is close to that of the stoichiometric reaction. For shifting catalysts, for example, iron, the reaction known as "water-gas-shift" is more significant so that the total production of water is always considerable but lower than that of the stoichiometric reaction.

Before purification, the water coming from the Fischer-Tropsch reaction (i.e. co-produced water) is generally subjected to preliminary separations. Typically, it passes through a three-phase separator from which an organic condensate, a vapour phase and an aqueous phase, which still contains organic compounds dissolved and in suspension, are obtained and it is preferably treated in a coalescence filter.

The water thus separated remains contaminated by hydrocarbon compounds, typically less than 1,000 ppm, and oxygenated compounds, soluble in water. The quantity of contaminants depends on the catalyst and on the reaction conditions, in particular temperature and pressure. The overall quantity of oxygenated compounds increases with an increase in the reaction temperature, the group of organic acids in a more significant way.

The main oxygenated contaminants are light alcohols such as methanol and ethanol, indicatively present in a quantity ranging from 0.5% by weight to 5% by weight. Heavier alcohols (for example, propanol, butanol, pentanol, etc.) and other oxygenated compounds, such as aldehydes (for example, acetaldehyde, propionaldehyde, butyraldehyde, etc.), ketones (acetone, methylpropylketone, etc.) and acids (for example, formic acid, acetic acid, propionic acid, butyric acid, isobutyric acid, valeric acid, hexanoic acid, heptanoic acid, octanoic acid, etc.), are also present in lower quantities, the latter indicatively present in concentrations lower than 1.5% by weight. The quantity of compounds present, within each group, decreases with an increase in the molecular weight, and compounds with up to 25 carbon atoms are included. The water can also contain small quantities of nitrogenous and sulphured compounds coming from the feedstock used, in addition to traces of metals which come from the reactor. The metals can also be present in the form of suspended solids.

The water coming from the Fischer-Tropsch reaction consequently does not have a commercial value and cannot be disposed of as such due to the organic compounds present in the same which can create various drawbacks. Oxygenated compounds (acids), for example, convey corrosive properties, hydrocarbons the tendency to form foams (foaming).

Furthermore, rainwater or other service water present in the production site can be added to the water coming from the Fischer-Tropsch reaction.

A treatment plant of the water coming from the Fischer-Tropsch reaction (i.e. co-produced water) is therefore necessary for both the re-use of the same within the Fischer-Tropsch process (for example, as process water, in particular in the production plant of synthesis gas ("syngas"), or as cooling water in the reaction section), and also for its disposal outside or for other further uses (for example, as water for irrigation, or drinking water).

The treatment or the combination of treatments of the water coming from the Fischer-Tropsch reaction is determined by the restrictions imposed by its final use and by the organic compounds present therein.

U.S. Pat. No. 7,147,775, for example, describes a process for obtaining purified water from water coming from the Fischer-Tropsch reaction which comprises at least the following steps:

(a) a first step comprising a biological treatment in order to remove at least a part of the organic compounds dissolved in said water obtaining a first aqueous stream enriched in water;

(b) a second step comprising a solid-liquid separation in order to remove at least some of the solid compounds from at least a part of said first aqueous stream enriched in water.

These dissolved organic compounds are typically selected from the group including aldehydes, ketones, alcohols and organic acids.

The term "purified water" refers to an aqueous stream having a COD ("chemical oxygen demand") ranging from 20 mg/l to 600 mg/l, a pH ranging from 6 to 9, a content of suspended solid compounds lower than 250 mg/l and a total content of dissolved solid compounds lower than 600 mg/l.

The biological treatment can comprise an anaerobic treatment. If this anaerobic treatment is not sufficient for removing said dissolved organic compounds from said first aqueous stream enriched in water, there can be an additional aerobic biological treatment step.

In order to obtain highly purified water, the above process comprises a third step including a removal treatment in order to remove at least a part of dissolved salts and of organic compounds from at least a part of said second aqueous stream enriched in water. Said removal treatment can be selected from the group comprising: chemical oxidation using agents such as ozone and hydrogen peroxide, free radicals generated by ultraviolet light, adsorption/absorption processes including treatments on activated carbon and organic scavenging resins.

The term "highly purified water" refers to an aqueous stream having a COD ("chemical oxygen demand") lower than 50 mg/l, a pH ranging from 6 to 9, a content of suspended solid compounds lower than 50 mg/l and a total content of dissolved solid compounds lower than 100 mg/l.

U.S. Pat. No. 7,150,831 describes a process for obtaining purified water from the water coming from the Fischer-Tropsch reaction which comprises at least the following steps:

(a) a first step comprising a separation treatment in order to remove at least a part of the non-acid oxygenated hydrocarbons present in said water obtaining a first aqueous stream enriched in water;

(b) a second step comprising a liquid-liquid extraction in order to remove at least a part of organic acids from at least a part of said first aqueous stream enriched in water obtaining a second aqueous stream enriched in water;

(c) a third step comprising a biological treatment in order to remove at least a part of the acid oxygenated hydrocarbons from at least a part of said second aqueous stream enriched in water obtaining a third aqueous stream enriched in water;

(d) a fourth step comprising a solid-liquid separation in order to remove at least some of the solid compounds from at least a part of said third aqueous stream enriched in water.

Said non-acid oxygenated hydrocarbons are typically selected from the group including alcohols, ketones, aldehydes.

The first step (a) can be carried out, for example, by means of distillation, or by means of extraction with a solvent.

The term "purified water" refers to an aqueous stream having a COD ("chemical oxygen demand") ranging from 20 mg/l to 500 mg/l, a pH ranging from 6 to 9, a content of suspended solid compounds lower than 250 mg/l and a total content of dissolved solid compounds lower than 600 mg/l.

The biological treatment can comprise an anaerobic, or aerobic treatment, or both.

In order to obtain highly purified water, step (d) of the above process is substituted by a final step comprising a removal treatment in order to remove at least a part of dissolved salts and of organic compounds from at least a part of said third aqueous stream enriched in water. Said removal treatment can be selected from the group comprising: chemical oxidation using agents such as ozone and hydrogen peroxide, free radical generated by ultraviolet light, adsorption/absorption processes including treatments on activated carbon and organic scavenging resins.

The term "highly purified water" refers to an aqueous stream having a COD ("chemical oxygen demand") lower than 50 mg/l, a pH ranging from 6 to 9, a content of suspended solid compounds lower than 50 mg/l and a total content of dissolved solid compounds lower than 100 mg/l.

U.S. Pat. No. 7,166,219 describes a process for obtaining purified water from the water coming from the Fischer-Tropsch reaction which comprises at least the following steps:

(a) a first step comprising a separation treatment in order to remove at least a part of the non-acid oxygenated hydrocarbons present in said water obtaining a first aqueous stream enriched in water;

(b) a second step comprising a biological treatment in order to remove at least a part of the acid oxygenated hydrocarbons from at least a part of said first aqueous stream enriched in water obtaining a second aqueous stream enriched in water;

(c) a third step comprising a solid-liquid separation in order to remove at least some of the solid compounds from at least a part of said second aqueous stream enriched in water.

Said non-acid oxygenated hydrocarbons are typically selected from the group including alcohols, ketones, aldehydes.

The first step (a) can be carried out, for example, by means of distillation, or by means of extraction with a solvent.

The term "purified water" refers to an aqueous stream having a COD ("chemical oxygen demand") ranging from 20 mg/l to 500 mg/l, a pH ranging from 6 to 9, a content of suspended solid compounds lower than 250 mg/l and a total content of dissolved solid compounds lower than 600 mg/l.

The biological treatment can comprise an anaerobic, or aerobic treatment, or both.

In order to obtain highly purified water, the above process comprises a final step comprising a removal treatment in order to remove at least a part of dissolved salts and of organic compounds from at least a part of said third aqueous stream enriched in water. Said removal treatment can be selected from the group comprising: chemical oxidation using agents such as ozone and hydrogen peroxide, free radical generated by ultraviolet light, adsorption/absorption processes including treatments on activated carbon and organic scavenging resins.

The term "highly purified water" refers to an aqueous stream having a COD ("chemical oxygen demand"—for greater simplicity, hereafter only indicated as COD) lower than 50 mg/l, a pH ranging from 6 to 9, a content of suspended solid compounds lower than 50 mg/l and a total content of dissolved solid compounds lower than 100 mg/l.

The biological treatment described in the above reported processes, however, can have some drawbacks, such as for example:

a high hydraulic retention time, or HRT, typically ranging from 20 hours to 50 hours, during the anaerobic biological treatment;

the necessity of subjecting the aqueous stream coming from said biological treatment to further treatments in order to obtain highly purified water (i.e. water having a COD lower than 50 mg/l);

the low quantity of organic substrate load which can be treated daily, i.e. an organic substrate load not higher than 16 kgCOD/$m^3$/day.

The Applicant considered the problem of obtaining highly purified water (i.e. water having a COD lower than or equal to 50 mg/l) by the purification of the aqueous stream coming from the Fischer-Tropsch reaction by means of an anaerobic biological treatment.

The Applicant has now found that it is possible to overcome the drawbacks described above by means of a purification process of the aqueous stream coming from the Fischer-Tropsch reaction which comprises a distillation and/or stripping treatment and an anaerobic biological treatment, said anaerobic biological treatment being carried out with a low hydraulic retention time (i.e. lower than or equal to 15 hours).

The Applicant has also found that this process allows a high organic substrate load to be treated daily (i.e. an organic substrate load higher than or equal to 17 kgCOD/m³/day.

An object of the present invention therefore relates to a process for the purification of an aqueous stream coming from the Fischer-Tropsch reaction which comprises:
feeding said aqueous stream containing the organic by-products of the reaction to a distillation column, obtaining two output streams:
an aqueous stream (i) exiting from the column head, enriched with alcohols having from 1 to 20 carbon atoms, preferably from 1 to 9 carbon atoms, and other optional volatile compounds;
an aqueous stream (ii) exiting from the column bottom, enriched with organic acids having from 1 to 10 carbon atom, preferably from 2 to 6 carbon atoms;
subjecting said aqueous stream (ii) to an anaerobic biological treatment obtaining a purified aqueous stream (iii);
wherein said anaerobic biological treatment is carried out with a hydraulic retention time lower than or equal to 15 hours, preferably ranging from 4 hours to 10 hours, more preferably from 5 hours to 8 hours.

For the purpose of the present invention and of the following claims, the definitions of the numerical ranges always comprise the extremes, unless otherwise specified.

The Fischer-Tropsch reaction can be carried out at a low temperature (LTFT), generally in the presence of catalysts based on cobalt or iron; or at a high temperature (HTFT), generally in the presence of catalysts based on iron.

For the purpose of the present invention, the Fischer-Tropsch reaction can be advantageously carried out as described in U.S. Pat. No. 6,348,510 whose content is considered incorporated herein as reference.

The aqueous stream (i) has a concentration of alcohols preferably higher than or equal to 20% by weight, more preferably ranging from 25% by weight to 70% by weight, with respect to the total weight of said aqueous stream (i).

Said aqueous stream (i) can optionally contain organic acids in a quantity lower than or equal to 20% by weight with respect to the total weight of the organic acids present in the aqueous stream fed to the distillation column. Said aqueous stream (i) can optionally comprise traces of salts of said organic acids in a quantity lower than or equal to 2% by weight with respect to the total weight of the organic acids present in the aqueous stream fed to the distillation column.

The aqueous stream (ii) has a concentration of organic acids preferably higher than or equal to 0.05% by weight, more preferably ranging from 0.1% by weight to 10% by weight, with respect to the total weight of said aqueous stream (ii).

Said aqueous stream (ii) preferably comprises a quantity of organic acids higher than or equal to 40% by weight, more preferably ranging from 60% by weight to 98% by weight, with respect to the total weight of the organic acids present in the aqueous stream fed to the distillation column.

Said aqueous stream (ii) can optionally contain salts of the organic acids contained therein, in a quantity lower than or equal to 80% by weight, preferably lower than or equal to 50% by weight, with respect to the total weight of the organic acids present in said aqueous stream (ii). Said aqueous stream (ii) can optionally comprise traces of alcohols in a quantity lower than or equal to 20% by weight, preferably lower than or equal to 10% by weight, with respect to the total weight of the alcohols present in the aqueous stream fed to the distillation column.

The purified aqueous stream (iii) preferably has the following characteristics:

COD: lower than or equal to 50 mg/l, more preferably ranging from 20 mg/l to 40 mg/l;
pH lower than or equal to 9, more preferably between 6 and 8;
a quantity of suspended solids (SS) lower than or equal to 250 mg/l, more preferably ranging from 50 mg/l to 200 mg/l;
a total quantity of dissolved solids lower than or equal to 600 mg/l, more preferably ranging from 300 mg/l to 550 mg/l.

For the purpose of the present invention and of the following claims, the term "other volatile compounds", optionally present in said aqueous stream (i), refers to compounds such as, for example, hydrocarbons, aldehydes, ketones, or mixtures thereof.

Alternatively, said distillation column can be a stripping column.

Alternatively, said distillation column can be a distillation and stripping column.

The distillation and/or stripping column consists of a condenser at the head, a reboiler at the bottom, enrichment stages situated above the feeding and exhaustion stages situated below the feeding. Said enrichment and exhaustion stages can be obtained with plates for distillation and/or stripping columns, or with internals of the structure or non-structured type.

For the purpose of the present invention, distillation and/or stripping columns having a configuration of the "asymmetric" type can be used, i.e. having a number of plates forming the theoretical enrichment stages equal to about half of the number of plates forming the theoretical exhaustion stages. Alternatively, distillation and/or stripping columns without plates forming the theoretical enrichment stages can be used.

For the purpose of the present invention and of the following claims, the term "aqueous stream (i) exiting from the column head" refers to the stream exiting from the condenser at the head forming part of said column. Said condenser is preferably a total condenser.

For the purpose of the present invention and of the following claims, the term "aqueous stream (ii) exiting from the column bottom" refers to the stream exiting from the reboiler at the bottom forming part of said column.

The distillation and/or stripping column preferably operates at atmospheric pressure even if said column is capable of functioning equally well at pressures higher or lower than atmospheric pressure such as, for example, pressures ranging from 0.5 ata (atmosphere absolute) to 4 ata (atmosphere absolute).

The temperatures are generally determined by the pressure and by the composition of the aqueous stream coming from the Fischer-Tropsch reaction. In general, at operating pressures ranging from 0.5 ata (atmosphere absolute) to 4 ata (atmosphere absolute), the temperature at the head of the column is maintained within the range of from 70° C. to 125° C., that at the bottom within the range of from 90° C. to 160° C.

In said distillation and/or stripping column, in addition to the formation of the above aqueous streams (i) and (ii) indicated above, there is also the elimination of the incondensable compounds present in the aqueous stream coming from the Fischer-Tropsch reaction.

For the purpose of the present description and of the following claims, the term "incondensable compounds" refers to traces of synthesis gas (e.g., hydrogen and/or carbon monoxide) optionally present in the aqueous stream coming from the Fischer-Tropsch reaction fed to the head of the column.

According to a preferred embodiment of the present invention, said anaerobic biological treatment can be carried out using an organic substrate load higher than or equal to 17 kgCOD/m$^3$/day, preferably ranging from 18 kgCOD/m$^3$/day to 25 kgCOD/m$^3$/day.

According to a preferred embodiment of the present invention, said anaerobic biological treatment can be carried out at a temperature ranging from 20° C. to 45° C., preferably ranging from 25° C. to 40° C.

According to a preferred embodiment of the present invention, said anaerobic biological treatment can be carried out at a pH ranging from 5.5 to 8.5, preferably ranging from 6 to 8.

In order to maintain the pH within the above values, an inorganic base can optionally be added to said aqueous stream (ii), which can be selected from hydroxides, oxides, carbonates, bicarbonates of alkaline or alkaline-earth metals, or mixtures thereof such as, for example, sodium hydroxide, potassium hydroxide, calcium hydroxide, calcium carbonate, magnesium oxide, magnesium carbonate, sodium bicarbonate, or mixtures thereof.

In order to regulate and to support the anaerobic metabolism and to accelerate the microbiological degradation of the organic acids present in said aqueous stream (ii), nutrients can be added to said aqueous stream (ii), which can be selected from nitrogen-containing compounds such as, for example, urea, ammonia, ammonium salts, or mixtures thereof; or phosphorous-containing compounds such as phosphates; or mixtures thereof.

Said nutrients can be added to said aqueous stream (ii) according to quantities known in the art. Said nutrients are preferably added to said aqueous stream (ii) in such a quantity that the weight ratio COD of said aqueous stream (ii): nitrogen (N):phosphorus (P), i.e. the COD:N:P weight ratio, ranges from 200:5:1 to 600:5:1. More preferably, said COD: N:P weight ratio is equal to 500:5:1.

Furthermore, microelements can be added to said aqueous stream (ii), such as, for example, copper, iron, manganese, molybdenum, boron, selenium, cobalt, or mixtures thereof. Said microelements are preferably added to said aqueous stream (ii) in a quantity lower than or equal to 1 ppm.

The anaerobic biological treatment can be carried out in reactors known in the art.

According to a preferred embodiment of the present invention, said anaerobic biological treatment can be carried out in a reactor selected from: UASB reactors (Up-flow Anaerobic Sludge Blanket reactors), Fixed Bed reactors, Fluidized Bed reactors, Expanded Bed reactors, Stirred Tank reactors, Membrane Bioreactors, Baffled reactors. UASB reactors (Up-flow Anaerobic Sludge Blanket reactors) are preferred.

At the end of said anaerobic biological treatment, in addition to said purified aqueous stream (iii), biogas is also obtained, i.e. a mixture of methane and carbon dioxide, preferably a mixture comprising from 65% by volume to 95% by volume, preferably from 75% by volume to 85% by volume, of methane, and from 5% by volume to 35% by volume, preferably from 15% by volume to 25% by volume, of carbon dioxide, with respect to the total volume of said mixture. Said mixture can optionally comprise traces of hydrogen and/or hydrogen sulfide, typically in quantities lower than 10 ppm. The biogas obtained can be used as fuel, or it can be used in the production plant of synthesis gas ("syngas") which will be subsequently sent to the Fischer-Tropsch plant for the production of hydrocarbons. It should be noted that the process object of the present invention allows high quantities of methane to be obtained (i.e. higher than or equal to 75% by volume).

At the end of the above process, sludge is also obtained, which can be sent for final disposal (for example, to a controlled waste disposal site or to incineration), or it can be re-used (for example, as fertilizer for agriculture).

In order to further purify the aqueous stream (iii), in particular to reduce the quantity of suspended solids (SS) and/or dissolved solids, more in particular to reduce the quantity of dissolved salts (e.g., salts which can be formed from the optional addition of bases for pH control and/or from the addition of nutrients, described above), said aqueous stream (iii) can be subjected to further treatments such as, for example, ultrafiltration, microfiltration, nanofiltration, reverse osmosis.

According to a preferred aspect of the present invention, said process also comprises subjecting the aqueous stream (iii) to an ultrafiltration or microfiltration treatment and to a subsequent reverse osmosis treatment, preferably to an ultrafiltration treatment and to a subsequent reverse osmosis treatment obtaining two output streams:
- a purified aqueous stream (iiia) (retentate) comprising a concentration of nutrients higher than or equal to 90% with respect to the total quantity of nutrients present in the aqueous stream (iii);
- an ultrapure aqueous stream (iiib) (permeate) having a conductivity lower than 10 microS/cm, essentially free of salts.

Said stream (iiib) preferably has the following characteristics:
- COD: lower than or equal to 20 mg/l, more preferably lower than or equal to 15 mg/l;
- a quantity of suspended solid (SS) lower than or equal to 5 mg/l, more preferably lower than or equal to 2 mg/l;
- a conductivity lower than 10 microS/cm, more preferably lower than or equal to 5 microS/cm.

It should be pointed out that said purified aqueous stream (iiia), enriched in nutrients, can be advantageously recycled to said anaerobic treatment allowing, in this way, the specific consumption of said nutrients to be reduced.

The ultrapure aqueous stream (iiib), on the other hand, can be used as process water, preferably in the production plant of synthesis gas ("syngas") which is subsequently sent to the Fischer-Tropsch plant for the production of hydrocarbons.

The above ultrafiltration, microfiltration, nanofiltration, reverse osmosis treatments, can be carried out using membranes and operating conditions known in the art.

The present invention will now be illustrated in greater detail through an illustrative embodiment with reference to FIG. 1 provided below.

The process of the present invention can be carried out as represented, for example, in FIG. 1.

In this case, the aqueous stream coming from the Fischer-Tropsch reaction (1), is fed to a distillation column (2).

An aqueous stream rich in alcohols (3) exits from the head of the distillation column.

The aqueous stream exiting from the bottom of the distillation column (4), rich in organic acids, is subsequently subjected to an anaerobic biological treatment (5), and is preferably fed to a UASB reactor ("Up-flow Anaerobic Sludge Blanket reactor"), obtaining a purified aqueous stream (6), a sludge (7), and a biogas (8) (i.e. a mixture of methane and carbon dioxide).

The purified aqueous stream (6) can be subjected to the further purification treatments described above, i.e. ultrafiltration, microfiltration, nanofiltration, reverse osmosis (not represented in FIG. 1).

Some illustrative and non-limiting examples are provided for a better understanding of the present invention and for its embodiment.

EXAMPLE 1

After having carried out the Fischer-Tropsch reaction (LTFT—catalyst cobalt) as described in U.S. Pat. No. 6,348,510 (IFP-ENI) and with reference to FIG. 1, the aqueous stream (1) which is separated by decanting from the reaction effluent, is fed to a distillation column (2). The composition of the aqueous stream (1), obtained by means of gaschromatography (to determine the quantity of alcohols) and by means of ion chromatography (to determine the quantity of organic acids), is indicated in Table 1. An aqueous stream (3) rich in alcohols is separated from the head of the distillation column together with an aqueous stream (4) exiting from the bottom of the distillation column enriched in organic acids. The composition of the aqueous stream (4), obtained by gaschromatography (to determine the quantity of alcohols) and by ion chromatography (to determine the quantity of organic acids), is indicated in Table 1.

TABLE 1

| COMPONENT | STREAM (1) (% by weight)* | STREAM (4) (% by weight)** |
|---|---|---|
| Water | 94.3 | 99.4 |
| Alcohols | 4.8 | 0.01 |
| Acids | 0.9 | 0.6 |
| Hydrocarbons | 0.01 | <0.01 |
| COD (mg/l) | >50000 | 6250 |

*% by weight with respect to the total weight of stream (1);
**% by weight with respect to the total weight of stream (4).

The above aqueous stream (4) was fed to a BIOPAQUES® UASB reactor ("Up-flow Anaerobic Sludge Blanket reactor") of Paques in order to carry out the anaerobic biological treatment.

Said reactor was subjected to the following operating conditions:

temperature: 31° C.-38° C.;
hydraulic retention time (HRT): 6 hours-7 hours;
pH: 7.5-7.7;
organic substrate load: 19 kgCOD/m$^3$/day-21 kgCOD/m$^3$/day.

NaOH in an aqueous solution at 5% was also added to said reactor, in such a quantity as to maintain the pH of the aqueous stream (2) at the values indicated above; nutrients, i.e. compounds comprising nitrogen and the compounds comprising phosphorous described above, in such a quantity as to have the following weight ratio: COD of said aqueous stream (2):N:P=500:5:1; calcium chloride in a quantity equal to 50 mg/l.

At the end of the above biological treatment, a biogas (8) was obtained, i.e. a mixture of methane and carbon dioxide, comprising 80% by volume of methane and 20% by volume of carbon dioxide, with respect to the total volume of said mixture and a purified aqueous stream (6) having the following characteristics:

COD: <30 mg/l (abatement percentage >99%);
pH: 7.5;
a quantity of suspended solids (SS) equal to 100 mg/l;
a total quantity of dissolved solids equal to 520 mg/l.

The invention claimed is:

1. A process for purifying an aqueous stream coming from the Fischer-Tropsch reaction, the process comprising:

feeding said aqueous stream comprising organic by-products of the Fischer-Tropsch reaction to a distillation column, obtaining two output streams: an aqueous stream (i) exiting from the column head, enriched with alcohols having 1 to 20 carbon atoms, and other optional volatile compounds; and an aqueous stream (ii) exiting from the column bottom, enriched with organic acids having from 1 to 10 carbon atoms; and subjecting said aqueous stream (ii) to an anaerobic biological treatment to obtain a purified aqueous stream (iii), wherein the anaerobic biological treatment is carried out with a hydraulic retention time lower than or equal to 15 hours and with an organic substrate load higher than or equal to 17 kgCOD/m$^3$/day to yield a purified aqueous stream, and wherein the purified aqueous stream (iii) has a COD lower than or equal to 50 mg/l; a pH of lower than or equal to 9; a quantity of suspended solids (SS) lower than or equal to 250 mg/l; and a total quantity of dissolved solid lower than or equal to 600 mg/l.

2. The process according to claim 1, wherein said anaerobic biological treatment is carried out with a hydraulic retention time ranging from 4 hours to 10 hours.

3. The process according to claim 2, wherein said anaerobic biological treatment is carried out with a hydraulic retention time ranging from 5 hours to 8 hours.

4. The process according to claim 1, wherein said aqueous stream (i) has a concentration of alcohols higher than or equal to 20% by weight with respect to the total weight of said aqueous stream (i).

5. The process according to claim 4, wherein said aqueous stream (i) has a concentration of alcohols ranging from 25% by weight to 70% by weight with respect to the total weight of said aqueous stream (i).

6. The process according to claim 1, wherein said aqueous stream (ii) has a concentration of organic acids higher than or equal to 0.05% by weight with respect to the total weight of said aqueous stream (ii).

7. The process according to claim 6, wherein said aqueous stream (ii) has a concentration of organic acids ranging from 0.1% by weight to 10% by weight with respect to the total weight of said aqueous stream (ii).

8. The process according to claim 1, wherein said purified aqueous stream (iii) has a COD: ranging from 20 mg/l to 40 mg/l; a pH ranging from 6 to 8; a quantity of suspended solids (SS) ranging from 50 mg/l to 200 mg/l; and a total quantity of dissolved solids ranging from 300 mg/l to 550 mg/l.

9. The process according to claim 1, wherein said anaerobic biological treatment is carried out using an organic substrate load ranging from 18 kgCOD/m$^3$/day to 25 kgCOD/m$^3$/day.

10. The process according to claim 1, wherein said anaerobic biological treatment is carried out at a temperature ranging from 20° C. to 45° C.

11. The process according to claim 10, wherein said anaerobic biological treatment is carried out at a temperature ranging from 25° C. to 40° C.

12. The process according to claim 1, wherein said anaerobic biological treatment is carried out at a pH ranging from 5.5 to 8.5.

13. The process according to claim 12, wherein said anaerobic biological treatment is carried out at a pH ranging from 6 to 8.

14. The process according to claim 1, further comprising adding an inorganic base to the aqueous stream (ii), wherein the inorganic base is selected from the group consisting of a hydroxide, an oxide, a carbonate, a bicarbonate of alkaline metal, a bicarbonate of an alkaline-earth metal, and a mixtures thereof.

15. The process according to claim 1, further comprising adding a nutrient nutrients to the aqueous stream (ii), wherein the nutrient is a nitrogen-containing compound, a phosphorus-containing compound or a mixture thereof.

16. The process according to claim 15, wherein said nutrient is added to said aqueous stream (ii) in such a quantity that the weight ratio COD of said aqueous stream (ii):nitrogen (N):phosphorus (P) is from 200:5:1 to 600:5:1.

17. The process according to claim 1, wherein said anaerobic biological treatment is carried out in an Up-flow Anaerobic Sludge Blanket reactor, a Fixed Bed reactor, a Fluidized Bed reactor, an Expanded Bed reactor, a Stirred Tank reactor, a Membrane Bioreactor, or a Baffled reactor.

18. The process according to claim 17, wherein said anaerobic biological treatment is carried out in an Up-flow Anaerobic Sludge Blanket reactor.

19. The process according to claim 1, further comprising subjecting the aqueous stream (iii) to an ultrafiltration or microfiltration treatment and to a subsequent reverse osmosis treatment obtaining two output streams:
- a purified aqueous stream (iiia) (retentate) comprising a concentration of nutrients higher than or equal to 90% with respect to the total quantity of nutrients present in the aqueous stream (iii);
- an ultrapure aqueous stream (iiib) (permeate) having a conductivity lower than 10 microS/cm, essentially free of salts.

20. The process according to claim 19, wherein said stream (iiib) has COD: lower than or equal to 20 mg/l; a quantity of suspended solid (SS) lower than or equal to 5 mg/l; and a conductivity lower than 10 microS/cm.

21. The process according to claim 19 or 20, wherein said purified nutrient-enriched aqueous stream (iiia) is recycled to said anaerobic treatment.

* * * * *